(12) United States Patent
Dyson (10) Patent No.: US 7,948,864 B2
(45) Date of Patent: May 24, 2011

(54) HIGH DIMENSION SIGNALING USING ORTHOGONAL WAVEFORM DIVISION MULTIPLEX

(75) Inventor: Timothy F. Dyson, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 101 days.

(21) Appl. No.: 12/504,696

(22) Filed: Jul. 17, 2009

(65) Prior Publication Data

US 2011/0013505 A1 Jan. 20, 2011

(51) Int. Cl.
*H04J 11/00* (2006.01)

(52) U.S. Cl. .................. 370/204; 370/208

(58) Field of Classification Search .............. 370/204, 370/208
See application file for complete search history.

(56) References Cited

U.S. PATENT DOCUMENTS

| | | |
|---|---|---|
| 3,488,445 A | 1/1970 | Chang |
| 5,903,598 A | 5/1999 | Hunsinger et al. |
| 7,340,000 B1 | 3/2008 | Hart et al. |
| 2008/0043861 A1 | 2/2008 | Moffatt |
| 2009/0259907 A1* | 10/2009 | Chernyshev et al. .......... 714/748 |
| 2009/0279620 A1* | 11/2009 | Schenk ................... 375/260 |

OTHER PUBLICATIONS

Nervig, A., U.S. Appl. No. 12/783,696, filed on May 20, 2010, entitled, "Time Dependent Equalization of Frequency Domain Spread Orthogonal Frequency Division Multiplexing Using Decision Feedback Equalization".

* cited by examiner

*Primary Examiner* — Melvin Marcelo
(74) *Attorney, Agent, or Firm* — Fox Rothschild, LLP; Robert J. Sacco (57) ABSTRACT

A communications system (100) includes a segmenter (204) for dividing a plurality of bits into a first segment and a second segment and a symbol mapper (208) for generating a plurality of symbols based on the first segment. The system also includes a co-set selector (214) for selecting a plurality of co-set waveforms from a plurality of orthogonal waveforms based on a co-set address defined by the second segment, a number (K) of the plurality of co-set waveforms being less than a number (N) of the plurality of orthogonal waveforms. The system further includes a modulator (210) for modulating the plurality of symbols based on the plurality of co-set waveforms.

23 Claims, 5 Drawing Sheets

HIGH DIMENSION SIGNALING USING ORTHOGONAL WAVEFORM DIVISION MULTIPLEX

FIELD OF THE INVENTION

The present invention relates to communications using orthogonal waveforms, and more specifically to systems and method for high dimension signaling using orthogonal waveform division multiplex.

BACKGROUND

In communications systems, multiplexing is a commonly used process for transmitting multiple analog message signals or digital data streams over a shared communications medium. In general, the multiplexing process divides the capacity of a low-level communications channel into several higher-level logical channels, one for each message signal or data stream to be transferred. A reverse process, known as demultiplexing, can extract the original channels on the receiver side. The two most basic forms of multiplexing are time-division multiplexing (TDM) and frequency-division multiplexing (FDM), both either in analog or digital form.

To supplement multiplexing techniques, orthogonal multiplex schemes are commonly used. That is, a large number of closely spaced orthogonal sub-carriers can be used to carry data as a collection of parallel data streams. In an orthogonal scheme, an ideal receiver can completely reject arbitrarily strong unwanted signals using different orthogonal basis functions or waveforms than included in the received signal. One exemplary orthogonal transmission scheme is TDMA, where the orthogonal basis functions are non-overlapping rectangular pulses. Another exemplary scheme is orthogonal frequency-division multiplexing (OFDM) is commonly utilized as a digital multi-carrier modulation method.

The orthogonality of the sub-carriers in such schemes typically results in high spectral efficiency, with a total symbol rate near the Nyquist rate. Accordingly, almost the whole available frequency band can be utilized for transmitting symbols. Furthermore, the orthogonality also effectively results in a simplification of channel equalization efforts since the operation of a multiplexed orthogonal scheme effectively results in converting a rapidly modulated wideband signal into a collection of slowly modulated narrowband signals. Consequently, the typical low symbol rate in each sub-carrier makes the use of guard intervals between symbols practical, making it possible to more effectively address time-spreading issues and reduce or eliminate inter-symbol interference (ISI). This mechanism also facilitates the design of single-frequency networks, where several adjacent transmitters send the same signal simultaneously at the same frequency, as the signals from multiple distant transmitters may be combined constructively, rather than interfering as would typically occur in a traditional single-carrier system.

SUMMARY

Embodiments of the present invention provide systems and methods for high dimension signaling using orthogonal waveform division multiplexing. In a first embodiment of the invention a device in a communications system is provided. The device includes a segmenter for dividing a plurality of bits into a first segment and a second segment and a symbol mapper for generating a plurality of symbols based on the first segment. The device also includes a co-set selector for selecting a plurality of co-set waveforms from a plurality of orthogonal waveforms based on a co-set address defined by the second segment, a number (K) of the plurality of co-set waveforms being less than a number (N) of the plurality of orthogonal waveforms, and a modulator for modulating the plurality of symbols based on the plurality of co-set waveforms.

In a second embodiment of the invention a device in a communications system is provided. The device includes a correlator for generating a plurality of modulated waveforms from a received signal based on a plurality of orthogonal waveforms, a number (K) of the plurality of modulated waveforms being less than a number (N) of the plurality of orthogonal waveforms. The device also includes a co-set selector for identifying a plurality of co-set waveforms from the plurality of orthogonal waveforms based on a co-set address derived from the plurality of modulated waveforms and a demodulator for demodulating the plurality of modulated waveforms into a plurality of symbols based on the plurality of co-set waveforms. The device further includes a symbol demapper for generating a first segment of bits based on the plurality of symbols based and a desegmenter for combining the first segment and a second segment into a plurality of bits, the second segment based on the plurality of co-set waveforms.

In a third embodiment of the invention a method is provided for secure communications in a communications network including at least first and second communications devices. The method includes transmitting a plurality of bits from the first device to the second device using a signal, the signal including a plurality of modulated waveforms, the plurality of modulated waveforms including a plurality of symbols representing a first segment of the plurality of bits modulated using a plurality of co-set waveforms, the plurality of co-set waveforms selected from a plurality of orthogonal waveforms based on a co-set address defined by a second segment of the plurality of bits. The method also includes extracting the plurality of bits from the signal at the second device, where a number (K) of the plurality of modulated waveforms is less than a number (N) of the plurality of orthogonal (basis set) waveforms.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, orthogonal multiplex signaling methods are widely available and are typically used with conventional symboling methods. Such conventional symboling methods are typically based on the isomorphic mapping of binary representations onto symbols that are more amenable to modulation and physical layer EM transmissions. However, such conventional symboling methods are typically one or two dimensional. That is, the physical layer constructs that carry the information, such as amplitude, frequency, phase, time, are polarity, are generally used either singly or in pairs. The two dimensional nature of such symboling techniques inherently limits the information density per symbol or code due to Euclidean distance, peak power or other limitations.

To overcome the symbol density limitations of conventional orthogonal multiplex signaling methods, the various embodiments of the invention provide systems and methods for increasing symbol density by using an orthogonal waveform division multiplexing. That is, the co-set of orthogonal functions or waveforms from a larger basis set of orthogonal waveforms are used to carry additional information. In particular, a portion of the data to be transmitted during a symbol period is not transmitted using conventional symboling techniques. Rather, this portion of the data is utilized to select a co-set of waveforms for the symbol period comprising a subset of a basis set of orthogonal waveforms. As a result, the waveforms in the subset vary according to the content of the portion of the data and effectively provide at least one additional symbol during the symbol period. Consequently, the symbol density is effectively increased for the symbol period without the need to add additional multiplex channels. In the various embodiments of the invention, this results in a high dimensional communication of information. That is, in addition to the pairing of physical layer constructs (two dimensional) at least one additional dimension is provided by utilizing a co-set selection techniques in accordance with the various embodiments of the invention. For example, the use of a dimensional modulation space >>2 can be used to increase the possible number of subsets, increasing the amount of data that can be transmitted by co-set selection while minimizing the transmitted energy.

In the various embodiments of the invention, the co-set selection essentially entails selection of a co-set of the collection of orthogonal waveforms during each symbol period. That is, for a collection of N orthogonal waveforms, a co-set comprising K of the N orthogonal waveforms is selected for modulation/demodulation of the K multiplex channels. In the various embodiments of the invention, these co-sets comprise different permutations of the N waveforms described by the permutation mapping:

$$\Pi(N,K,S) = \text{collection of all permutations } (a_1, a_2, \ldots, a_{N-K}, b_1, \ldots, b_K),$$

where $a_{N-j+1}=0$, $b_j=1$, and $j=1, 2, \ldots, K$. This produces a collection of co-sets having a cardinality of $N!/((N-K)!K!)$. The co-sets are then essentially defined as a unique subset of M of these $N!/((N-K)!K!)$ permutations, where $M=2^m$ and $m \equiv \log_2[N!/((N-K)!K!)]$.

As a result of defining a unique set of $M=2^m$ of the permutations, this allows each of the M permutations to be mapped to a unique binary m-bit address. Accordingly, the unique permutation of waveforms to be used during each symbol period can be selected using an input m-bit value. Therefore, in the various embodiment of the invention, if K symbols, representing K*p bits, are to be transmitted using one of the M permutations of K of the N orthogonal waveforms, selectable by an m-bit segment, the total number of bits that can transmitted during a symbol period is increased from K*p to m+K*p.

Although K can be any number less than N, in some embodiments, the selection of certain values of K can be advantageous. For example, the system can be over designed such that N>>K. This configuration increases the number of unique permutations. For example, when K~N/2, the size of the collection of permutations is $N!/(K!)^2$ in this case is greater than any other choice for K, and the value of M is likewise maximized and provides the largest number of unique permutations. Accordingly, m is also increased, permitting a greater number of bits to be encoded using co-set selection. This also decreases the likelihood that a signal will be intercepted or detected, as the variation in the co-set between different symbol periods is significantly increased. Furthermore, the value of S can also be selected advantageously. In particular, by selecting S=2 (Boolean), the resulting set of permutations causes the energy in each symbol transmitted to be held constant independent of the transmitted information. Therefore, in one embodiment, the collection of permutations can be defined by the permutation mapping $\Pi(N, N/2, 2)$.

The permutation mapping $\Pi(N, N/2, 2)$ generally (asymptotically) results in a value of m on the order of N. As a result, the number of bits transmitted per symbol period using conventional symboling and co-set selection in accordance with an embodiment of the invention can be increased significantly. For example, if $N=16$, then $m=\log_2[16!/(8!)^2]=13.65 \equiv 13$ bits. Accordingly, 13 bits can be used to uniquely identify 8,192 unique permutations (i.e., co-sets). Therefore, if each conventionally impressed symbol is comprised of two bits (e.g., a 4-ary PSK or ASK symbol), during each symbol period, a total of 29 bits can be transmitted ([16/2]*2 bits in the symbols+13 bits for co-set selection). Effectively, the number of bits per symbol period can be effectively doubled without the need for additional channels during a symbol period and without an increase in the transmitted energy.

Although the use of a collection of orthogonal waveforms can potentially allow a large amount of data to be transmitted using co-set selection, and the number of co-set waveforms can be selected to provide a complex signal, this does not necessarily guarantee that the transmission is secure. In some instances, the co-set of waveforms could present hidden opportunities for detection and interception. These mainly occur through cyclo-stationary or intentional periodicities of the underlying choice of basis set waveforms. Accordingly, in some embodiments of the invention, the collection of orthogonal waveforms can comprise a collection of maximum entropy waveforms and spread-spectrum. The use of such waveforms makes it difficult for an third party to discover transmissions using the co-set or to ascertain the co-set, resulting in a low probability of detection (LPD) of the signal and/or a low probability of interception (LPI) of the signal.

For example, in one embodiment, the co-set of waveforms can comprise a set of Gaussian waveforms or waveforms generated from Gaussian distributed sequences. However, the invention is not limited in this regard and other types of high entropy waveforms or sequences can be used in the various embodiments of the invention. For example, in other embodiments, Uniformly Distributed amplitude waveforms can be used for cases involving finite support, or von Mises Distributed waveforms can be used for amplitudes distributed on a unit circle.

Figure 1:
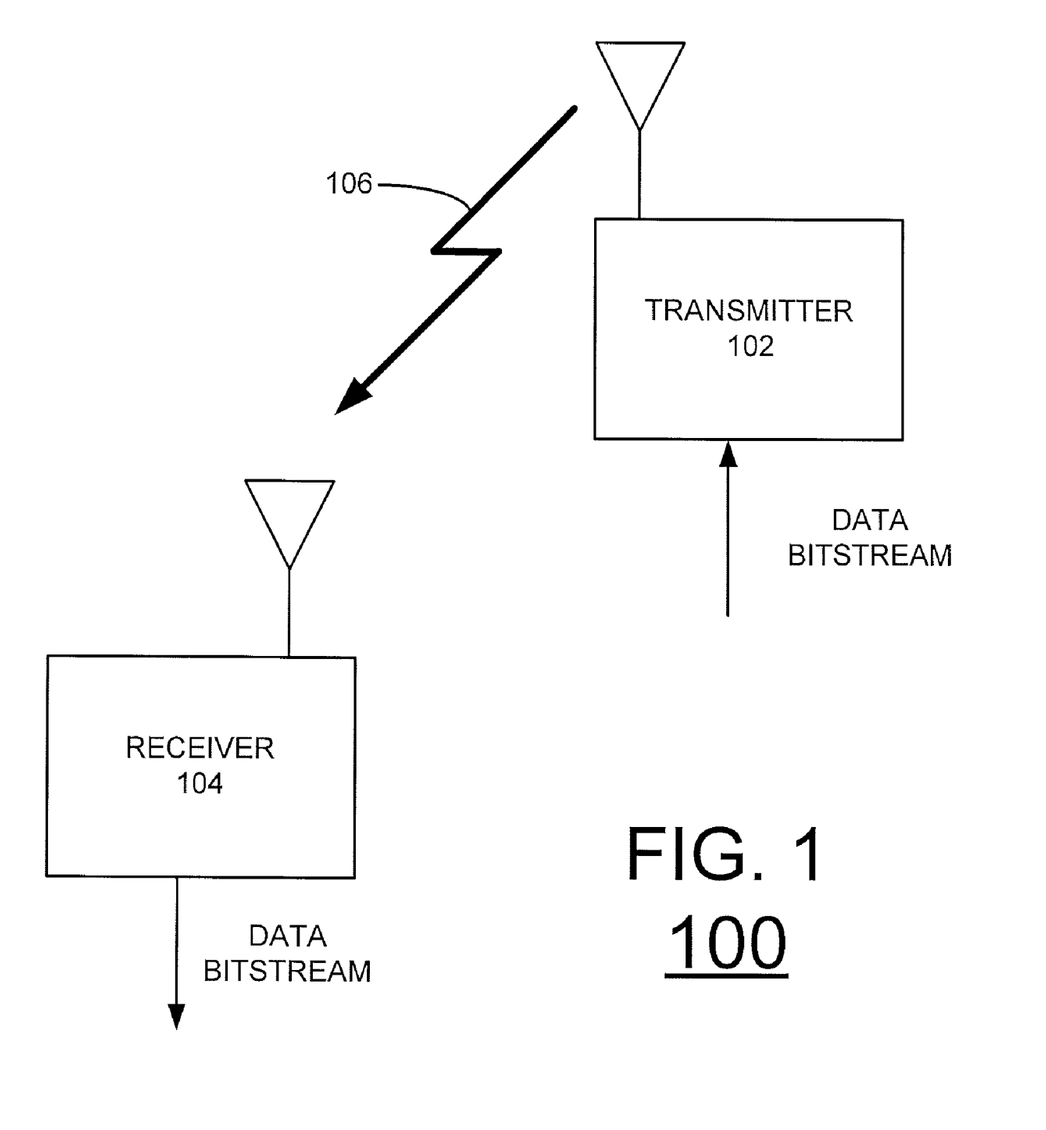
FIG. 1 shows a diagram of an exemplary orthogonal waveform division multiplex (OWDM) communication system configured in accordance with an embodiment of the invention.

Referring now to FIG. 1, there is provided an exemplary orthogonal waveform division multiplex (OWDM) communication system 100 configured in accordance with an embodiment of the invention. The communication system 100 is comprised of a transmitter 102 and a receiver 104. The communication system 100 can operate such that a transmitted signal has a spread power level below the receiver 104 noise floor. As stated above, the term "noise floor" as used herein refers to the level of noise which exists in a signal, measured at the input of a receiver.

The transmitter 102 is configured to receive a data bitstream, convert the data bitstream into a signal, and transmit the signal over a communications link. In operation, the transmitter 102 can generate the data signal by converting a first portion (K*p bits) of an n-bit data bitstream into data symbols for each of K multiplex channels. The symbols for each channel can be encoded a symbol coding or modulation technique, such as phase-shift keying (PSK), frequency-shift keying (FSK), amplitude-shift keying (ASK), quadrature amplitude modulation (QAM), or variants thereof, to name a few. However, the various embodiments of the invention are not limited in this regard and any other type of symbol coding technique can also be used. Once the symbols are generated, a set of K basis waveforms can be used to modulate each of the K multiplex channels, where the set K of waveforms are selected from a collection of orthogonal waveforms using a second portion (m-bits) of the n-bit data bitstream. The transmitter 102 can process the K modulated symbols to generate an analog signal suitable for transmission over a communications link. The transmitter 102 is further configured to communicate signals 106 to the receiver 104 via a communications link. The transmitter 102 will be described in greater detail below in relation to FIG. 2.

The receiver 104 is configured to receive transmitted signals 106 from the transmitter 102. The receiver 104 is further configured to down convert, digitize, and demultiplex the transmitted signal 106 by correlating it with replicas of the collection of orthogonal waveforms generated at the transmitter 102 to ascertain the K modulated waveforms and the set of K basis waveforms. The receiver 104 is further configured to demodulate the K modulated waveforms to recover the symbols to retrieve the K*p bits (the first portion of the n-bit data bitstream) therein by decoding the symbols. The receiver 104, based on the ascertained set of K basis waveforms, is also configured to recover the second portion (m-bits) of the n-bit data bitstream used to select the set of K basis waveforms at the transmitter 102. The receiver 104 is further configured to reproduce the n-bit data bitstream after such decoding and recovery. The receiver 104 is described in greater detail below in relation to FIG. 3.

Figure 2:
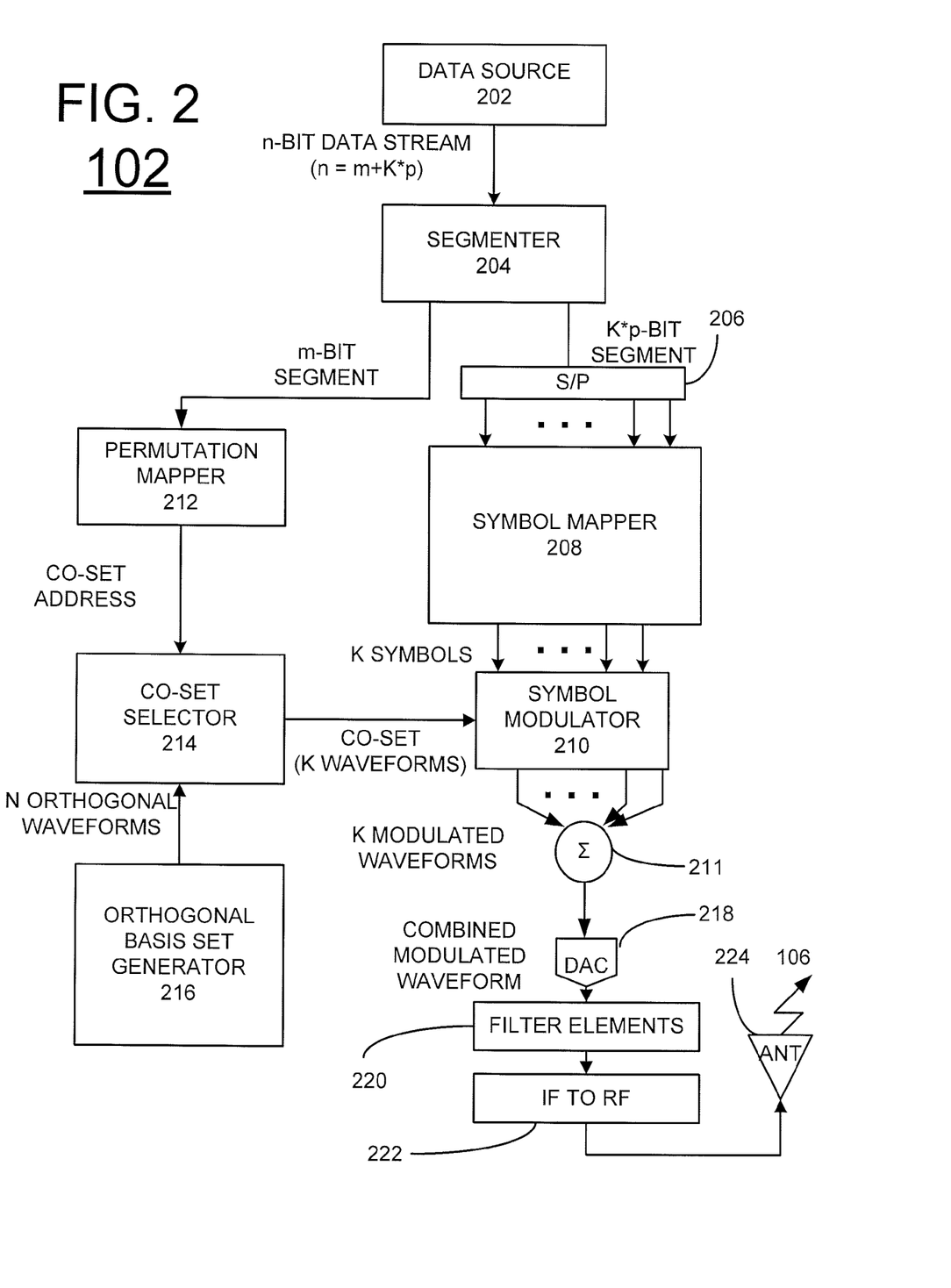
FIG. 2 is an exemplary block diagram of the transmitter shown in FIG. 1, according to an embodiment of the invention.

Referring now to FIG. 2, there is provided an exemplary block diagram of the transmitter 102 shown in FIG. 1. The transmitter includes a data source 202. The transmitter also includes a segmenter 204, a serial to parallel (S/P) element 206, a symbol mapper 208, a symbol modulator 210, and a summing circuit 211. The transmitter also includes a permutation mapper 212, a co-set selector 214, and an orthogonal basis set (waveform) generator 216. Additionally, the transmitter also includes a digital to analog converter (DAC) 218, filter elements 220, an intermediate frequency (IF) to radio frequency (RF) conversion device 222, and an antenna element 224.

In operation, the data source 202 can be configured to receive bits of data from an external data source (not shown) as bits of data. In this regard, it should be appreciated that the data source 202 can be an interface configured for receiving an input signal containing data from an external device (not shown). The data source 202 is further configured to supply n bits of data to the segmenter 204 at a particular data transfer rate—the symboling rate (SR). The n bits of data received at the segmenter 204 represent any type of information that may be of interest to a user. For example, the data can be used to represent text, telemetry, audio, or video data. Further, the data may be a multiplex of data from distinct users or data sources.

The segmenter 204 receives the n bits of data and divides the bits in first and second segments, comprising K*p bits and m bits, respectively. The first and second segments of the n-bit data bitstream are then provided to the S/P element 206 and permutation mapper 206, respectively. The segmenter 204 can be further configured to supply bits of data to the S/P element 206 and permutation mapper 206 at a particular data transfer rate. In some embodiments of the invention, the segmenter 204 can also be configured to include error correction coding of the first and second segments to maximum advantage based on un-equal coding rules matched to the specific application.

The S/P element 206 converts the K*p bits into K streams or channels of p bits. The K streams are then provided to the symbol mapper 208, where the p bits in each stream are mapped (i.e, coded or modulated) to a symbol to generate K symbols. In the various embodiments of the invention, any symbol coding or modulation methods can be used, including PSK, ASK, FSK, and QAM, to name a few. Once the K symbols are generated, the K symbols are modulated in symbol modulator 210 using a set of K orthogonal basis waveforms (the co-set) to create a set of K modulated waveforms. Selection of the co-set of K out of N waveforms will be described below in greater detail. Afterwards, the set of K modulated waveforms are combined sample by sample at summing circuit 211 and the combined signal is communicated to components 218-224 to generate signal 106. In one embodiment of the invention, the number of samples in each basis set waveform is much greater than the symboling rate (SR) in accordance with the spread-spectrum nature of the basis set (i.e., the bandwidth >>SR). However, the embodiments of the invention are not limited in this regard.

At summing circuit 211, the K modulated waveforms can be linearly combined into a single symbol for transmission. This combined symbol can be expressed as:

$$s(t) = \sum_{n=0}^{\infty} \sum_{k=1}^{K} c_{kn} \varphi_{\pi(k)}(t - nT_S)$$

where $c_{kn}$ are the $2^P$-ary A/PSK or PSK symbols, Ts is the symbol period or interval, n is the symbol pulse, and $(\phi_{\pi(k)}$ is the $k^{th}$ basis component of the co-set associated with the m-bit co-set address $$k = \sum_{r=0}^{m-1} \beta_{r-1} 2^r$$

and $\{\beta_r : r=1, \ldots, m\}$ are the co-set selection bits.

In transmitter 102, the set of K orthogonal basis waveforms are selected from a collection of N orthogonal basis waveforms generated by generator 216 using elements 212 and 214. As described above, for selected values of N and K, the m bits in the second segment can be used to select one of M unique permutations. However, the total number of unique permutations available using the collection of N orthogonal basis waveforms can be greater than M (i.e., N!/((N−K)!K!) >M). As a result, the unique permutations being used can vary between different communication systems. Accordingly, the mapping between the different values specified by the m-bit segment and the unique permutations for a particular communications system can be specified prior to operation of system 100. In some embodiments of the invention, the selected permutations can be randomly associated with the different m-bit addresses to provide greater security. Accordingly, prior to selection of the K basis waveforms using co-set selector 214, permutation mapper 212 generates a co-set address or signal from the m-bit segment. The co-set address uniquely identifies one of the M permutations for the symbol period.

In some embodiments the co-set address can comprise a unique identifier for one of the permutations. For example, in one embodiment, the co-set address can comprise a value that uniquely identifies the one of the M permutations. However the invention is not limited in this regard. In another embodiment, the co-set address can include identifiers for the K waveforms to be used.

In the various embodiments of the invention, the mapping operation in permutation mapper 212 can be performed in several ways. In some embodiments, the mapping operation can be a look-up operation, where the permutation mapper 212 accesses a (fixed) table in memory which specifies the co-set address associated with the m-bit value. In another embodiment, the mapping operation can be performed using a function that computes the co-set address based on the m-bit value.

However, the invention is not limited in this regard and any other type of mapping techniques can be used, including that one in which the basis set is varied (or regenerated) at a periodic rate to increase transmission security. For example, in one embodiment, instead of generating a single collection of N orthogonal waveforms, a number of different collections of N orthogonal waveforms can be generated. In such an embodiment, the co-set address would specify the collection to use and the one of the M permutations to be used from the selected collection. Although, such a configuration can increase complexity of the transmitter and receiver in system 100, the greater variety in basis set waveforms further enhances security.

The co-set address is then communicated by permutation mapper 212 to co-set selector 214. Using the co-set address, the co-set selector 214 then selects the set of K basis waveforms from the (current) collection of N orthogonal waveforms generated by generator 216. The selected set of K basis waveforms is then communicated to symbol modulator 210 for modulating the K symbols, as described above.

FIG. 2, is one exemplary architecture of a transmitter for communications system 100. However, the invention is not limited in this regard and any other transmitter architecture can be used with communications system 100 without limitation. For example, other architectures may include less components than shown in FIG. 2 or employ additional components to control other aspects of the transmitter 102. For example, a clock element (not shown) can be coupled to the various components in transmitter 102 to synchronize their operations during a symbol period and auxiliary information may be coupled into the basis set generator to enhance transmission security as needed.

Figure 3:
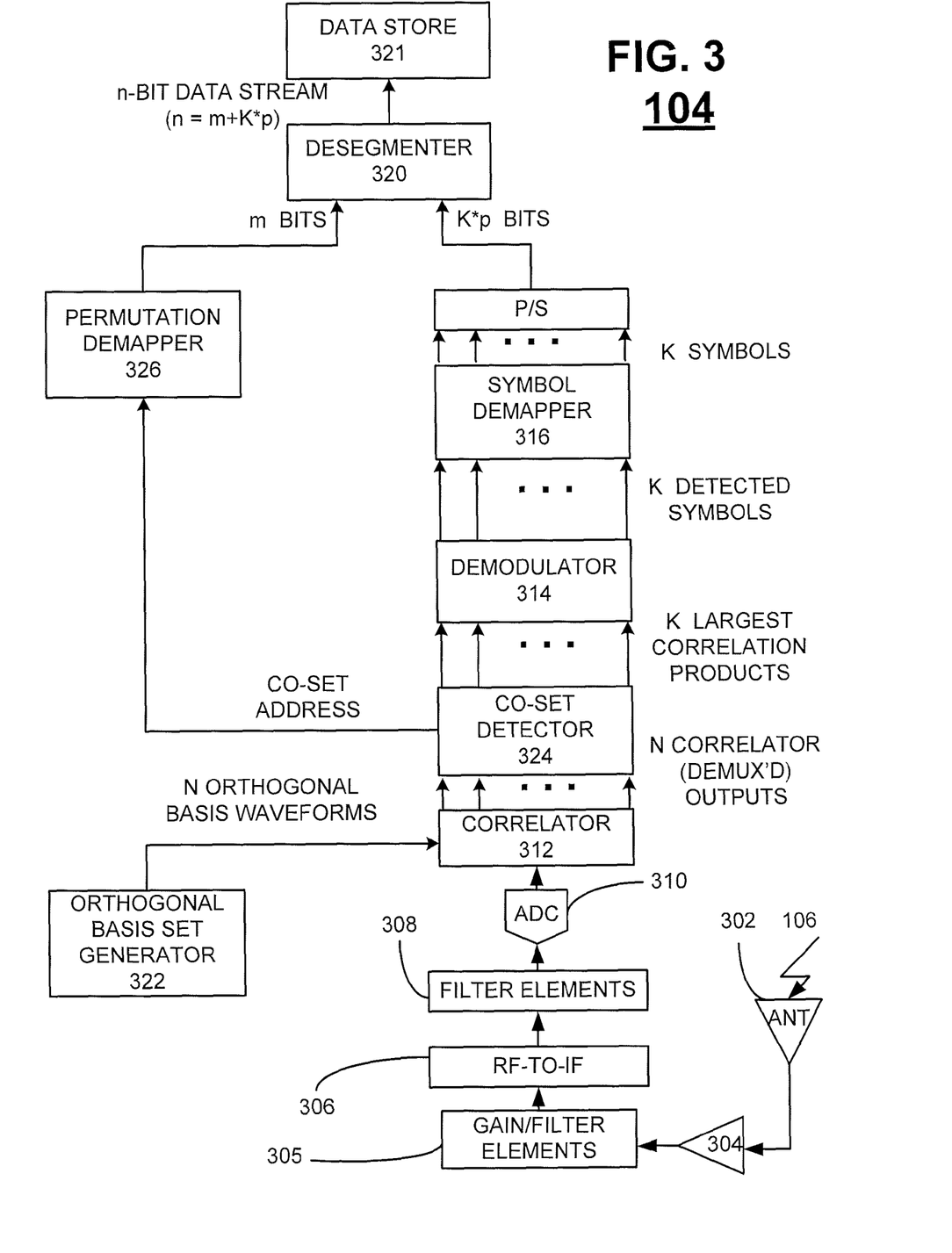
FIG. 3 is an exemplary block diagram of the receiver shown in FIG. 1, according to an embodiment of the invention.

Referring now to FIG. 3, there is provided an exemplary block diagram of the receiver 104 shown in FIG. 1. The receiver 104 includes an antenna element 302, a low noise amplifier (LNA) 304, filter/gain elements 305, a radio frequency (RF) to intermediate frequency (IF) conversion device 306, additional filter elements 308, and an analog to digital (A/D) converter (ADC) 310. The receiver 104 also includes a correlator 312, a demodulator 314, a symbol demapper 316, an parallel to serial (P/S) element 318, a desegmenter 320, and a data store 321. The receiver 104 further includes an orthogonal basis set generator 322, a co-set detector 324, and a permutation demapper 326.

Referring again to FIG. 3, the antenna 302 is configured to receive signal 106 from a transmitter, such as transmitter 102 in FIG. 1. The antenna element 302 is also configured to communicate the analog input signal 106 to the LNA 304. The LNA 304 is configured to amplify the analog input signal 106 while adding as little noise and distortion as possible. The LNA 304 is also configured to communicate an amplified, analog input signal to the filter/gain elements 305. These can include a zonal filter comprising an analog filter with slow roll off characteristic but low injection loss used to suppress large interfering signals outside of bands of interest. Elements 305 can also include an automatic gain control (AGC) amplifier for keeping the magnitude of the received signal within normal bounds for the rest of the signal processing chain. The filter/gain elements are configured to communicate a gain adjusted, analog input signal to the RF to IF conversion device 306.

The RF to IF conversion device 306 is configured to mix the analog input signal to a preferred IF for conversion to a digital signal at the A/D converter 310. The RF to IF conversion device 306 is also configured to communicate the mixed analog input signal to filter elements 308. Elements 308 can include an anti-alias filter configured to restrict a bandwidth of a mixed analog input signal. Element 308 is also configured to communicate a filtered, analog input signal to the A/D converter 310. The A/D converter 310 is configured to convert a received analog input signal to a digital signal. The digital signal can then be communicated to the correlator 312.

Correlator 312 is configured to de-spread or pulse compress the K modulated waveforms based on the N orthogonal waveforms generated by generator 322 using one or more correlation operations. For example, in one embodiment of the invention, correlator 312 can be configured to perform a cross-correlation operation using each of the N orthogonal waveforms with the signal from ADC 310. The correlator 312 then communicates N correlator outputs to the co-set detector 324. The K cross-correlation signals with a highest signal to noise ratio are then selected by the co-set detector 324 and the corresponding K largest correlation products of detector 324 from the collection of N orthogonal waveforms are assumed to be the set of K basis waveforms used at the transmitter 102. In one embodiment of the invention, the co-set detector 324 can be configured to utilize the Kth order statistic to form a maximum likelihood detection operation using the envelope of the output of correlators 312. Demodulator 314, then uses these K detected waveforms from the co-set detector 324 to extract the K multiplexed symbols from the signal from ADC 310. However, the various embodiments of the invention are not limited in this regard and other types of correlation operations can be performed in correlator 312 and co-set detector to extract the K modulated waveforms depending on the specific application and type of security required during a secure communications session. For example, in one alternative embodiment of the invention, the correlator can be configured to perform a frequency domain correlation. However, the embodiments of the invention are not limited in this regard.

As described above with respect to transmitter 102 in FIG. 2, the transmitter 102 can generate signal 106 using multiple collections of orthogonal basis sets. Accordingly, in other to extract the K modulated waveforms in such embodiments, the correlator 312 would be configured to perform correlation operations for all possible collections and generate corresponding demultiplexed outputs. For example, if transmitter 102 selects the co-set from 4 different collections of N basis set waveforms, correlator 312 and co-set detector 324 would have to be configured to perform the correlation and detection operations using 4N waveforms, increasing complexity of receiver 104.

In addition to extracting the K modulated waveforms, the co-set detector 324 can also generate the co-set address associated with the detected K modulated waveforms. As described above with respect to FIG. 2, the co-set address uniquely identifies one of the M permutations used by the transmitter 102 to modulate the K symbols. The co-set address can be generated based on the results of the correlation operation(s) at correlator 312. The co-set detector 324 is also configured to communicate the co-set address to the permutation demapper 326.

In some embodiments the co-set address can comprise an identifier for one of the permutations. For example, in one embodiment, the co-set address can comprise a value that uniquely identifies one of the M permutations. However the invention is not limited in this regard. In another embodiment, the co-set address can include identifiers for the K waveforms.

As described above with respect to the co-set selector 214 in FIG. 2, the co-set detector 324 can be configured, based on the co-set address, to communicate K of the collection of N orthogonal waveforms correlations to demodulator 314. Using this co-set of correlation results demodulator 314 produces K symbols. The K symbols are then communicated to symbol demapper 316 and the p bits in each of the K symbols are extracted. The K*p bits can then be reassembled into a first segment using P/S element 318.

Concurrently, the permutation demapper 326 can generate the second segment of m bits from the co-set address received from correlator 312. The operation of permutation demapper 326 is the opposite of the operation of permutation mapper 212 in FIG. 2. That is, in permutation demapper 326, each co-set address is associated with an m-bit string. Therefore, when the co-set address is received from co-set detector 324, the corresponding m-bit string is retrieved and the permutation demapper 326 outputs the retrieved m-bit string as the second segment.

In the various embodiments of the invention, the demapping operation in permutation demapper 326 can be performed in several ways. In some embodiments, the mapping operation can be a look-up operation, where the permutation demapper 326 accesses a table in memory which specifies the m-bit value associated with the co-set address. In another embodiment, the demapping operation can be performed using a function that computes the m-bit value based on the co-set address then extant as a result of auxiliary information increasing the transmission security. However, the invention is not limited in this regard and any other type of demapping techniques can be used.

The first and second strings are then communicated to the desegmenter 320 from the P/S element 318 and the permutation demapper 326. The desegmenter then assembles the n-bit (n=m+K*p) data bitstream and communicates the n-bit data bitstream to a data store 321 configured to receive the bits of data. The operation at desegmenter 320 is the opposite of the operation at segmenter 204 in FIG. 2. In some embodiments of the invention, this operation can include forward error correction decoding as appropriate for the possibly unequal coding of the various segments. The data source 321 can be configured to communicate bits of data to an external data source (not shown) as bits of data. In this regard, it should be appreciated that the data source 202 can be an interface configured for transmitting an output signal containing data to an external device (not shown) including to demultipex the data for delivery to multiple distinct users or data sinks.

FIG. 3, is one exemplary architecture of a receiver for communications system 100. However, the invention is not limited in this regard and any other transmitter architecture can be used with communications system 100 without limitation. For example, other architectures may include less components than shown in FIG. 3 or employ additional components to control other aspects of the receiver 104. For example, a clock element (not shown) can be coupled to the various components in receiver 104 to synchronize their operations during a symbol period.

As described above, the collection of N orthogonal waveforms can comprise a collection of N Gaussian waveforms. However, in some cases it can be necessary to process the Gaussian waveforms for purposes of providing efficient quantization and controlling potential inadvertent spectral shaping in the IF/RF sections that may degrade waveform orthogonality. Accordingly, in embodiments using Gaussian waveforms, a generator may include one or more components for pulse-shaping, filtering, or otherwise conditioning the Gaussian waveforms. This is conceptually illustrated in FIG. 4.

Figure 4:
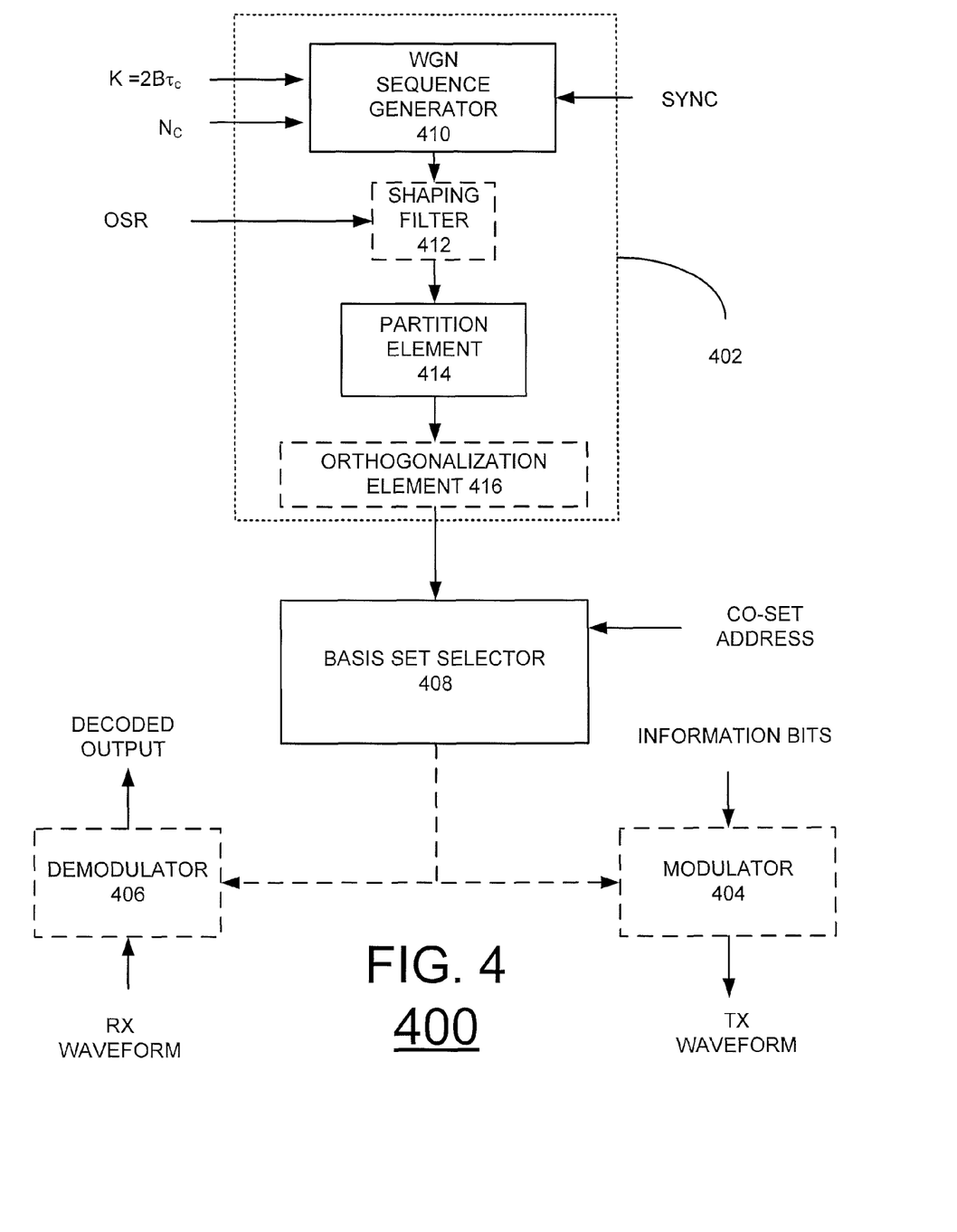
FIG. 4 is a block diagram of an exemplary communications device configured in accordance with an embodiment of the invention.

FIG. 4 is a block diagram of an exemplary communications device 400 configured in accordance with an embodiment of the invention. As shown in FIG. 4, device 400 can include a orthogonal wave generator 402, a modulator 404, a demodulator 406, and a basis set selector 408. In operation, generator 402 can generate L*N Gaussian waveforms that are communicated to basis set selector 408. Basis set selector 408 selects N of these waveforms based on $q=\log_2(L)$ additional co-set address bits, augmenting that as described above with respect to FIGS. 2 and 3. The N waveforms are then communicated to the modulator 404 and/or demodulator 406 depending on the operation of device 100. Using the N waveforms indicated by the q additional co-set selection bits, the modulator 404 is used to convert n information bits into a transmitted waveform, such as described above with respect to FIG. 2. Demodulator 406 is used to convert a received waveform into a decoded output, such as described above with respect to FIG. 3. Although FIG. 4 is simplified for illustrative purposes, one of ordinary skill in the art would recognize that device 100 would include other components, including those shown in FIGS. 2 and 3 for operating device 100 as a transmitter, a receiver, or as a transceiver.

As described above, orthogonal waveform generator 402 is configured for generating Gaussian waveforms. Accordingly, generator 402 can include an white Gaussian noise (WGN) generator 410 for generating an indefinite length Gaussian sequence. The WGN generator 410 can be configured to receive as inputs an $N_c$ value, the number of codes, and the $K=2B\tau_c$ value, defining the code length as a function of a bandwidth time product, and a SYNC value, to synchronize generation of the Gaussian sequence with other devices, and to supply a timing synchronization reference to the receiver. Operation of a WGN generator is well-known to those of ordinary skill in the art and will not be discussed here.

In some embodiments of the invention, the Gaussian sequence generated by the WGN generator 410 can be shaped using a shaping filter 412. This can be done for several reasons, such as to control the bandwidth of the outbound signal. In general, generating a Gaussian number sequence generally produces waveforms that are at exactly the sampling rate (FS). As a result, the signal bandwidth will typically be exactly FS/2, the Nyquist limit. Therefore, when this waveform is outputted via a D/A converter, the inherent sin(x)/x response of the D/A converter will "shape" the signal. This type of shaping can affect the orthogonality of the generated waveforms, namely reducing the orthogonality of the waveforms. However, if the waveform is oversampled or shaped at some point in the processing chain before D/A converter, these shaping effects can be reduced or eliminated. The term "oversampled", as used herein with respect to a signal, refers to increasing the sampling rate of a signal or interpolating additional data points between sampled data points. Thus, including the shaping filter 412 in waveform generator 402 provides a convenient and controlled method of ensuring that orthogonality between the various waveforms is maintained through the IF/RF elements. Furthermore, during the oversampling process, the quantization noise produced during digital sampling is spread evenly over the entire sampling bandwidth. As a result, a reduction in noise is also provided by the shaping filter 412. However, in some embodiments, a shaping filter or oversampling element can be provided outside the generator 400. For example, in one embodiment of the invention, the shaping filter 412 could be removed from generator 400 and the oversampling operation can instead be performed at the D/A converter without spectral shaping.

Waveform generator 402 also includes a re-organization or partition element 414 for generating the Gaussian basis set waveforms. In general, WGN generator 410 generates a single Gaussian sequence. In order to generate the set of Gaussian waveforms, the partition element 414 is used to take the sequence from WGN generator 410 and divide the sequence into vectors, each defining a waveform. For example, if WGN 410 generates a sequence of N*K samples, the partition element 414 divides the N*K long sequence into K consecutive vectors, each of length N. These vectors are then organized into a matrix A having dimensions N×K. The matrix A contains the Gaussian orthogonal vectors (i.e., the Gaussian orthogonal waveforms). In some embodiments of the invention, partitioning can be performed by simply modulo K addressing the serial samples or by a demultiplexing (commutation) operation having N arms. However, the various embodiments of the invention are not limited in this regard and other partitioning methods can be used.

As described above, the partition element 414 generates a matrix A that provides the Gaussian orthogonal waveforms. However, in some instances, when pulse shaping is employed (i.e., filter 412 is included), the vectors defined by matrix A may not be completely orthogonal. Accordingly, generator 400 can also include an orthogonalization element 416 for generating a set of orthogonal waveforms from the waveforms defined by matrix A using an orthogonal decomposition of matrix A. Element 416 can be configured to perform the decomposition in several ways. For example, in some embodiments of the invention, the element 416 can be configured to process the matrix A using a modified Gram-Schmidt process, a Householder rotation process, a singular value decomposition process, a U-R decomposition, or any variants thereof. However, the embodiments of the invention are not limited in this regard and any other type of orthogonal decomposition process can be used at element 416. Once orthogonalization element 416 generates the orthogonal waveforms, these can be communicated to basis set selector 408 for use by modulator 404 and/or demodulator 406, as described above.

FIG. 4 illustrates one exemplary architecture of an orthogonal waveform generator for a communications system in accordance with the various embodiment of the invention. However, the invention is not limited in this regard and any other orthogonal waveform generator architecture can be used without limitation. For example, other architectures may include less components than shown in FIG. 4 or employ additional components to control other aspects of the generator 402.

EXAMPLES

The following non-limiting examples serve to illustrate selected embodiments of the invention. It will be appreciated that variations in proportions and alternatives in elements of the components shown will be apparent to those skilled in the art and are within the scope of embodiments of the present invention.

Table 1 illustrates the achievable data rates at the indicated spreading gains and using a maximum entropy orthogonal multiplex of 8, 9, and 13 spread-spectrum basis set waveforms, respectively when a controlled PSD deviation in the noise background is a constraint on the design. As shown in Table 1, assuming 23 dB of spreading gain in an 80 MHz occupied bandwidth, embodiments of the invention can achieve a delivered rate of 11.6 Mbps with only a 0.5 dB increase in the background "Noise" spectrum at the targeted receiver location. The data in Table 1 was generated by specifying the maximum perturbation in the PSD ($S_D(K)$)allowed relative to the thermal noise as a result of the transmitted signal at the intended receiver location, L. This maximum allowed perturbation along with the spreading gain were then used to calculate the maximum number of waveforms in a multiplex that achieves this limit. The maximum allowed perturbation was then combined with the desired occupied bandwidth and spreading factor to determine the maximum allowable symboling rate and therefore data rate (assuming QPSK impressed modulation in addition to the optimal permutation co-set encoding).

TABLE 1

Example OWDM Design maximizing data rate and maintaining LPI/LPD Character

| | For $S_D(K) < L$ | | | | | |
|---|---|---|---|---|---|---|
| L (dB) | 0.5 | | 1 | | 2 | |
| Channel BW (MHz) | 80 | 80 | 80 | 80 | 80 | 80 |
| Spreading Gain (dB) | 30 | 23 | 30 | 23 | 30 | 23 |
| Symb rate (KHz) | 80 | 400.9 | 80 | 400.9 | 80 | 400.9 |
| bits/Symb | 29 | 29 | 34 | 34 | 50 | 50 |
| Data Rate (Mbps) | 2.3 | 11.6 | 2.7 | 13.6 | 4.0 | 20.0 |

Figure 5:
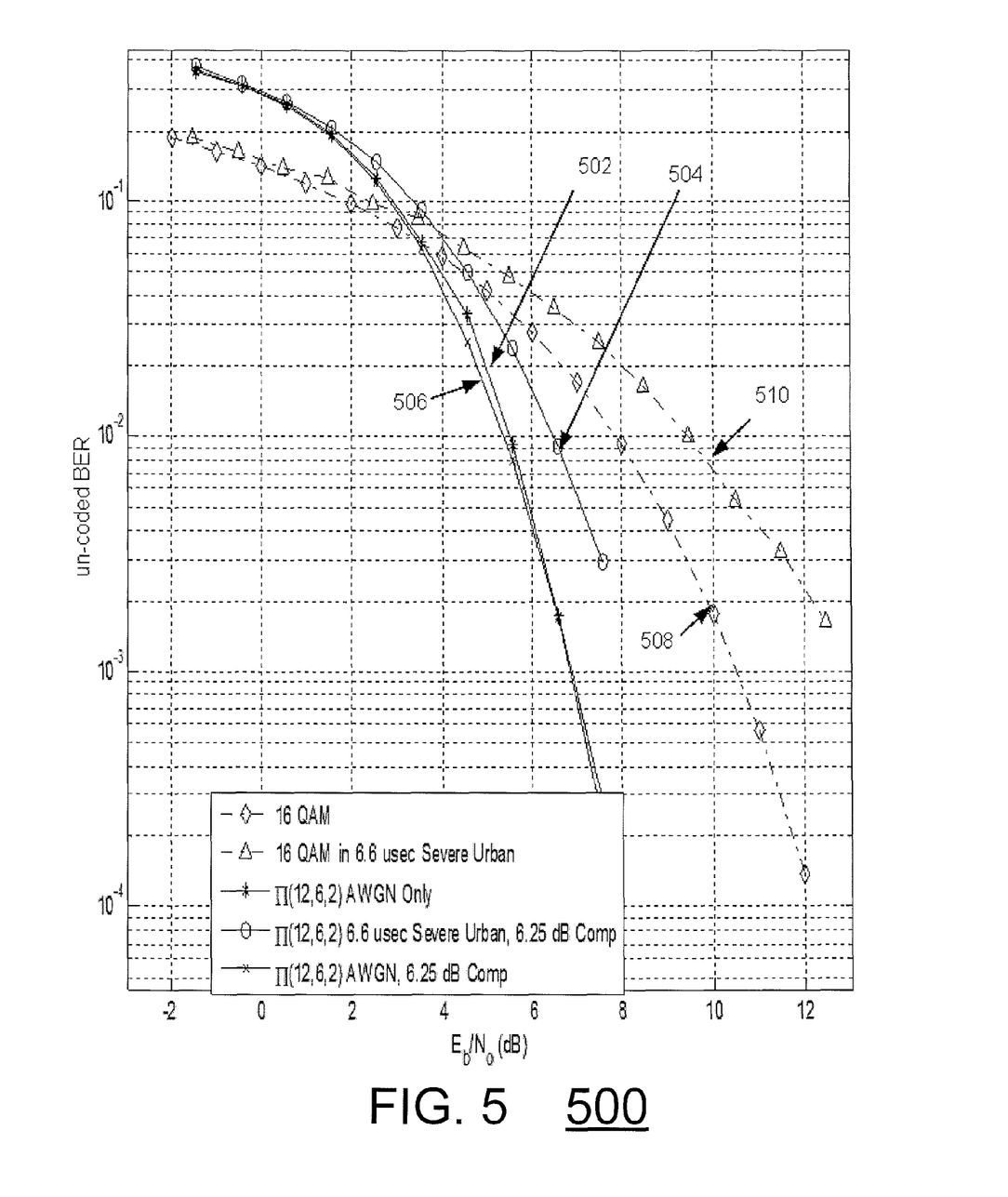
FIG. 5 is an x-y plot of un-coded BER performance as a function of background noise level ($E_b/N_o$) for transmission using conventional modulation and transmissions using OWDM in accordance with an embodiment of invention.

As shown in Table 1, the number of bits encoded per symbol is about 2× higher than is normally provided with traditional spread-spectrum modulation. Furthermore, this increase in data rate is achieved with an associated (uncoded) bit-error rate (BER) performance that is quite favorable. FIG. 5 illustrates these results.

FIG. 5 is an x-y plot of un-coded BER performance as a function of background noise level ($E_b/N_o$) for transmissions using conventional modulation and transmissions using OWDM in accordance with an embodiment of invention (data rate normalized). In particular, the example employs a maximum entropy basis set (Gaussian waveforms generated from a WGN generator) using 12 waveforms of which only six are simultaneously transmitted. As a result 9-bits encode the co-set of six basis set waveforms each modulated by QPSK symbols delivering 21-bits per symboling period. The basis set is designed with a spreading gain of 23 dB. As shown in FIG. 5, this typical OWDM design is compared to an equivalent data rate 16 QAM (12-4 APSK) designs. The OWDM designs include a WGN-based, $\Pi(12,6,2)$ design (Curve 502, "*"), a WGN-based, $\Pi(12,6,2)$ design accounting for typical urban (8 usec delay spread) multipath and with a 6.25 dB amplifier compression (Curve 504, "o"), and a WGN-based, $\Pi(12,6,2)$ design with a 6.25 dB amplifier compression (Curve 506 "x"). As the multiplex of Gaussian distributed amplitudes remains Gaussian (and therefore maximum entropy) it exhibits a significant peak-to-average power ratio. The latter can be a serious impediment to transmit amplification resulting in inefficient operation. These results show that the OWDM waveform using the Gaussian waveforms endures significant compression at the transmitter without degrading performance at the receiver thus allowing greatly increased amplifier efficiency. The 16 QAM design includes a conventional 16 QAM transmission with raised-root cosine pulse shaping (Curve 508, open diamonds) and a 16 QAM transmission accounting for typical urban (as above) multipath (Curve 510, open triangles). As shown in FIG. 5, for a specified signal-to-noise level, the performance of the OWDM designs is equivalent or superior. At SNR levels of less than 4 dB, the BER is higher for OWDM, but not significantly so At SNR levels greater than 4 dB, the BER between the designs significantly diverges. In particular at a SNR level between 5 and 6 dB, the BER for conventional QAM 16 is an order of magnitude greater than that for OWDM designs in accordance with an embodiment of the invention. As the SNR level continues to increase, the difference also increases. Thus FIG. 5 not only illustrates the superior BER performance of the OWDM designs, but also illustrates the robustness of the method to urban multipath and its robustness under amplifier compression in the transmitter.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A device in a communications system, comprising:
    a segmenter for dividing a plurality of bits into a first segment and a second segment;
    a symbol mapper for generating a plurality of symbols based on said first segment;
    a co-set selector for selecting a plurality of co-sets from a plurality of orthogonal waveforms based on a co-set address defined by said second segment, a number (K) of said plurality of co-set waveforms being less than a number (N) of said plurality of orthogonal waveforms; and
    a modulator for modulating said plurality of symbols based on said plurality of co-set waveforms.

2. The device of claim 1, wherein a number (m) of said plurality of bits in said second segment is defined by:

$$m = \left\lfloor \log_2 \frac{N!}{((N-K)!K!)} \right\rfloor.$$

3. The device of claim 1, wherein K is equal to N/2.

4. The device of claim 1, wherein said plurality of co-set waveforms comprise one of a plurality of co-sets of said plurality of orthogonal waveforms defined by a permutation mapping ($\Pi(N, K, 2)$) comprising the collection of all permutations ($a_1, a_2, \ldots, a_{N-K}, b_1, b_2, \ldots, b_K$) where $a_{N-j}=0$, $b_j=1$, and $j=1, 2, \ldots, K$.

5. The device of claim 1, further comprising a permutation mapper for deriving said co-set address from said second segment.

6. The device of claim 1, further comprising an orthogonal waveform generator for generating said plurality of orthogonal waveforms.

7. The device of claim 6, wherein said orthogonal waveform generator comprises an indefinite length white Gaussian noise sequence generator.

8. The device in claim 1, wherein the segmenter is configured to perform an unequal error correction encoding of the data stream.

9. A device in a communications system, comprising:
a correlator for generating a plurality of modulated waveforms from a received signal based on a plurality of orthogonal waveforms, a number (K) of said plurality of modulated waveforms being less than a number (N) of said plurality of orthogonal waveforms;
a co-set selector for identifying a plurality of co-set waveforms from the plurality of orthogonal waveforms based on a co-set address derived from said plurality of modulated waveforms;
a demodulator for demodulating said plurality of modulated waveforms into a plurality of symbols based on said plurality of co-set waveforms;
a symbol demapper for generating a first segment of bits based on the plurality of symbols;
a desegmenter for combining the first segment and a second segment into a plurality of bits, said second segment based on said plurality of co-set waveforms.

10. The device in claim 9, wherein the signal comprises an unequally encoded segmented transmission data stream, and wherein the desegmenter is configured to perform a forward error correction device.

11. The device of claim 9, wherein a number (m) of said plurality of bits in said second segment is defined by:

$$m = \left\lfloor \log_2 \frac{N!}{((N-K)!K!)} \right\rfloor.$$

12. The device of claim 9, wherein K is equal to N/2.

13. The device of claim 9, wherein said plurality of co-set waveforms comprise one of a plurality of co-sets of said plurality of orthogonal waveforms defined by a permutation mapping ($\Pi(N, K, 2)$) comprising the collection of all permutations ($a_1, a_2, \ldots, a_{N-K}, b_1, b_2, \ldots, b_K$) where $a_{N-j}=0$, $b_j=1$, and $j=1, 2, \ldots, K$.

14. The device of claim 9, further comprising a permutation mapper for deriving said co-set address from said second segment.

15. The device of claim 9, further comprising an orthogonal waveform generator for generating said plurality of orthogonal waveforms.

16. The device of claim 15, wherein said orthogonal waveform generator comprises an indefinite length white Gaussian noise sequence generator.

17. A method for providing secure communications in a communications network comprising at least first and second communications devices, the method comprising:
transmitting a plurality of bits from the first device to the second device using a signal, said signal comprising a plurality of modulated waveforms, said plurality of modulated waveforms comprising a plurality of symbols representing a first segment of said plurality of bits modulated using a plurality of co-set waveforms, said plurality of co-set waveforms selected from a plurality of orthogonal waveforms based on a co-set address defined by a second segment of said plurality of bits; and
extracting said plurality of bits from said signal at said second device,
wherein a number (K) of said plurality of modulated waveforms is less than a number (N) of said plurality of orthogonal waveforms.

18. The method of claim 17, wherein said extracting further comprises:
identifying the plurality of co-set waveforms based on said co-set address derived from said plurality of modulated waveforms at said second device;
demodulating said plurality of modulated waveforms to obtain said plurality of symbols based on said plurality of co-set waveforms identified at said second device;
generating the first segment based on the plurality of symbols obtained at said second device;
demapping the co-set address at said second device to generate the second segment; and
combining the first segment and the second segment.

19. The method of claim 17, wherein a number (m) of said plurality of bits in said second segment is defined by:

$$m = \left\lfloor \log_2 \frac{N!}{((N-K)!K!)} \right\rfloor.$$

20. The method of claim 17, wherein said plurality of co-set waveforms comprise one of a plurality of co-sets of said plurality of orthogonal waveforms defined by a permutation mapping ($\Pi(N, K, 2)$) comprising the collection of all permutations ($a_1, a_2, \ldots, a_{N-K}, b_1, b_2, \ldots, b_K$) where $a_{N-j}=0$, $b_j=1$, and $j=1, 2, \ldots, K$.

21. The method of claim 17, further comprising generating said plurality of orthogonal waveforms from a white Gaussian noise sequence.

22. The method of claim 17, further comprising selecting K to be equal to N/2.

23. The method of claim 17, wherein said plurality of orthogonal waveforms comprises a plurality of basis sets, said co-set address further defines a one of the plurality basis sets, and said transmitting further comprises generating said plurality of waveforms based on said one of said plurality of basis sets.

* * * * *